United States Patent
Sell et al.

(10) Patent No.: US 10,960,576 B1
(45) Date of Patent: Mar. 30, 2021

(54) POLYMER COMPOSITES CONTAINING CARBON NANOTUBES AND METHODS RELATED THERETO

(71) Applicant: Lockheed Martin Corporation, Bethesda, MD (US)

(72) Inventors: Aaron G. Sell, Salem, NH (US); Jonathan W. Ward, San Jose, CA (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 36 days.

(21) Appl. No.: 16/424,317

(22) Filed: May 28, 2019

Related U.S. Application Data

(62) Division of application No. 15/415,776, filed on Jan. 25, 2017, now Pat. No. 10,343,304.

(51) Int. Cl.
| | |
|---|---|
| *B29B 11/16* | (2006.01) |
| *B33Y 70/00* | (2020.01) |
| *B33Y 40/00* | (2020.01) |
| *B33Y 30/00* | (2015.01) |
| *B29B 11/10* | (2006.01) |
| *B29K 69/00* | (2006.01) |
| *B29K 79/00* | (2006.01) |
| *B29K 105/16* | (2006.01) |
| *B29K 507/04* | (2006.01) |

(52) U.S. Cl.
CPC ............. *B29B 11/16* (2013.01); *B29B 11/10* (2013.01); *B33Y 30/00* (2014.12); *B33Y 40/00* (2014.12); *B33Y 70/00* (2014.12); *B29K 2069/00* (2013.01); *B29K 2079/085* (2013.01); *B29K 2105/16* (2013.01); *B29K 2507/04* (2013.01)

(58) Field of Classification Search
CPC .......... B29B 11/16; B29B 11/10; B29B 9/06; B29K 2105/16; B29K 2069/00; B29K 2507/04; B29K 2079/085; B33Y 70/00; B33Y 40/00; B33Y 30/00; D01H 1/00; D01H 3/00
USPC ....................................... 264/176.1
See application file for complete search history.

(56) References Cited

U.S. PATENT DOCUMENTS

| | | | |
|---|---|---|---|
| 7,001,556 B1* | 2/2006 | Shambaugh | B82Y 30/00 264/210.6 |
| 2013/0108826 A1* | 5/2013 | Chakravarthi | H01B 13/0036 428/114 |
| 2016/0185050 A1* | 6/2016 | Topolkaraev | B29C 64/106 264/308 |
| 2016/0297952 A1 | 10/2016 | Chen et al. | |

* cited by examiner

*Primary Examiner* — Hannah J Pak
(74) *Attorney, Agent, or Firm* — Morgan, Lewis & Bockius LLP

(57) ABSTRACT

Polymer composites containing carbon nanotubes often exhibit high glass transition temperatures, which can complicate their use in additive manufacturing processes. Extruded filaments containing carbon nanotubes and residual solvent can have desirably lowered glass transition temperatures. Extruded filaments can contain a polymer as a continuous phase, a nanomaterial such as carbon nanotubes homogeneously mixed throughout the continuous phase, and above 0% to about 15% solvent by weight. Methods for making extruded filaments can include producing a solvated composite by dissolving a polymer and a nanomaterial in a solvent, producing a partially desolvated composite by reducing a solvent content of the solvated composite to a range of about 10% to about 30% by weight, forming particles of the partially desolvated composite, supplying the particles to an extruder, and extruding a filament having the polymer as a continuous phase and the nanomaterial homogeneously mixed throughout the continuous phase, which also contains residual solvent.

9 Claims, 2 Drawing Sheets

POLYMER COMPOSITES CONTAINING CARBON NANOTUBES AND METHODS RELATED THERETO

CROSS-REFERENCE TO RELATED APPLICATIONS

The present application is a divisional of U.S. application Ser. No. 15/415,776, titled "POLYMER COMPOSITES CONTAINING CARBON NANOTUBES AND METHODS RELATED THERETO" filed Jan. 25, 2017, the content of which is incorporated herein by reference in its entirety for all purposes.

STATEMENT REGARDING FEDERALLY SPONSORED RESEARCH OR DEVELOPMENT

Not applicable.

FIELD

The present disclosure generally relates to nanomaterials and, more specifically, to polymer composites containing carbon nanotubes.

BACKGROUND

Three-dimensional (3-D) printing, also known as additive manufacturing, is a rapidly growing technology area that operates by depositing small droplets or streams of a melted or softened printing material in precise deposition locations under the control of a computer. Deposition of the printing material results in gradual, layer-by-layer buildup of a printed object, which can be in any number of complex shapes. At present, additive manufacturing processes are largely used for rapid prototyping purposes, but there is significant interest in extending these techniques to mass manufacturing. While printed prototypes need not necessarily be entirely functional or mechanically robust, mass manufactured objects need to be. At present, additive manufacturing processes do not yet have effective solutions for these and several other issues, as discussed hereinafter.

Polymers are among the more commonly used printing materials in additive manufacturing processes, although non-polymeric printing materials can be used in some instances. One problematic feature of polymer-based printing materials is that most polymers are not electrically conductive. When electrical conductivity of a finished object is necessary, the poor electrical conductivity of polymers can limit the breadth of printed objects that can be suitably produced using additive manufacturing techniques. Polymers can also lack sufficient mechanical strength and thermal conductivity for some high-performance applications.

There has been ongoing interest in incorporating carbon nanotubes and other nanomaterials within polymer composites due to the ability of these nanomaterials to convey electrical conductivity to an otherwise non-conductive polymer matrix, as well as to improve mechanical strength and other properties. Although some success has been realized in incorporating carbon nanotubes into polymer matrices, the carbon nanotubes are often not effectively dispersed from one another and compositional heterogeneity frequently results. Among other undesirable factors, compositional heterogeneity can lead to structural weak points in the composite.

In general, the incorporation of carbon nanotubes into a polymer significantly increases the glass transition temperature of the resulting polymer composite. The increased glass transition temperature can approach or exceed the decomposition temperature of the polymer itself, which can make carbon nanotube polymer composites difficult or impossible to use in conventional additive manufacturing processes. In addition, the compositional heterogeneity of many carbon nanotube polymer composites remains an ongoing concern for their potential use in forming printed objects, especially for high-performance applications.

In view of the foregoing, improved materials for use in additive manufacturing processes would be highly desirable in the art. The present disclosure satisfies the foregoing need and provides related advantages as well.

SUMMARY

In some embodiments, the present disclosure describes methods for forming a polymer composite and extruded filament. The methods include: dissolving a polymer and a nanomaterial in a solvent, thereby producing a solvated composite; reducing a solvent content of the solvated composite to within a range of about 10% to about 30% by weight, thereby producing a partially desolvated composite; forming first particles of the partially desolvated composite; supplying the first particles to an extruder; and extruding a first filament containing the polymer as a continuous phase and the nanomaterial homogenously mixed throughout the continuous phase. At least a portion of the solvent remains in the first filament.

In some embodiments, the present disclosure describes extruded filaments and foams formed from a polymer composite. The extruded filaments include a polymer as a continuous phase, a nanomaterial homogeneously mixed throughout the continuous phase, and above 0% to about 15% solvent by weight. Printed objects and additive manufacturing processes employing the extruded filaments are also disclosed herein.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
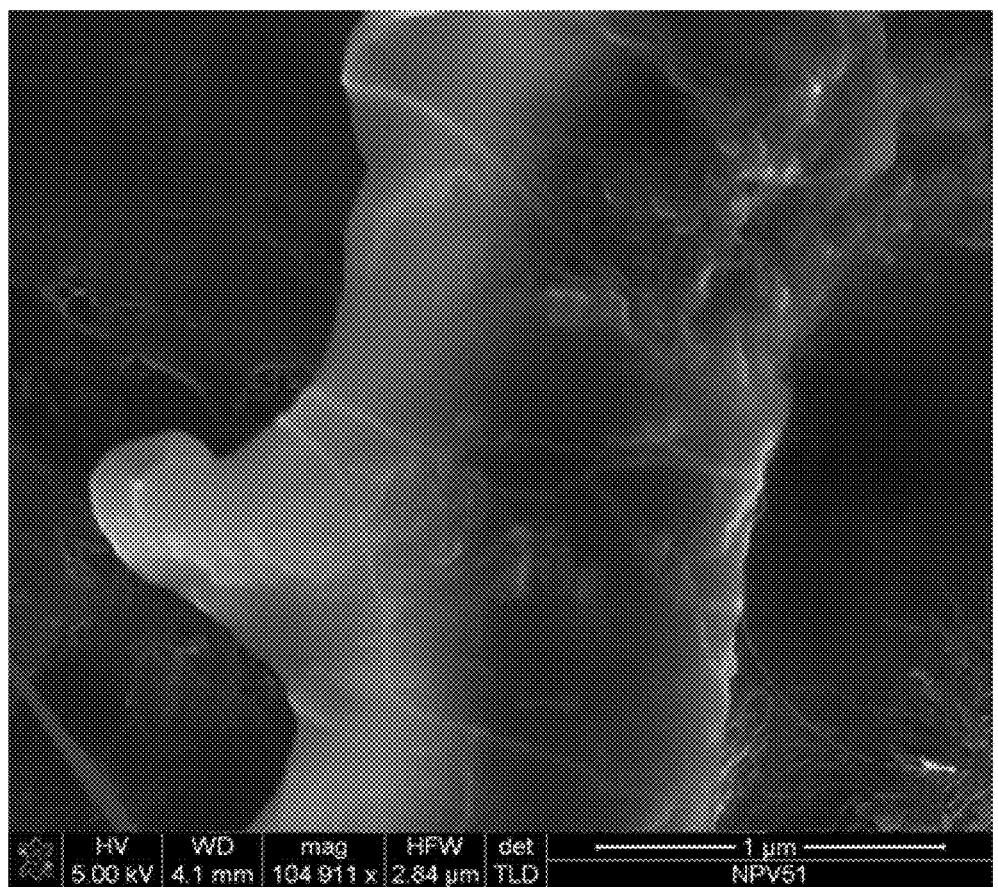
FIG. 1 shows an illustrative SEM image of the extruded filament produced in Example 3.

The present disclosure is directed, in part, to methods for producing an extruded filament defined by a nanomaterial polymer composite, such as a carbon nanotube polymer composite. The present disclosure is also directed, in part, to extruded filaments and foams defined by a nanomaterial polymer composite, such as a carbon nanotube polymer composite. The present disclosure is also directed, in part, to printed objects and additive manufacturing processes employing an extruded filament defined by a carbon nanotube polymer composite.

Carbon nanotubes have been widely proposed for use in a number of applications in order to take advantage of their beneficial combination of chemical, mechanical, electrical, and thermal properties. There are a number of difficulties associated with expressing these desirable properties in an end product, however. For example, direct incorporation of carbon nanotubes into a polymer matrix via melt blending can result in poor dispersion of the carbon nanotubes from themselves (i.e., via exfoliation or debundling) and incomplete mixing of the carbon nanotubes throughout the composite. Solvent-based blending techniques, in contrast, can be complicated by the limited solubility of non-functionalized carbon nanotubes in most solvents, in addition to low polymer solubility values in many instances. Although various solubility-improving carbon nanotube functionalization techniques are now available, they frequently diminish the extremely desirable electrical conductivity properties of non-functionalized carbon nanotubes.

Incorporation of carbon nanotubes into a polymer frequently increases the glass transition temperature of the resulting carbon nanotube polymer composite. For some applications, the increased glass transition temperature can be desirable. However, in applications where subsequent reflow of the polymer composite is needed, such as during 3-D printing and other additive manufacturing processes, the exceedingly high glass transition temperature of high-performance polymers containing carbon nanotubes can be problematic. Specifically, the polymer itself can degrade below the effective glass transition temperature, or the glass transition temperature can simply be so high that the carbon nanotube polymer composite is incompatible with print heads used in conventional additive manufacturing processes. In addition, the low solubility of carbon nanotubes has conventionally precluded their use in additive manufacturing processes.

The present inventors made a number of concurrent discoveries that can facilitate the production of polymer composites containing carbon nanotubes and/or other nanomaterials, as discussed hereinafter. Although the present disclosure is largely directed to carbon nanotube polymer composites, particularly composite forms such as foams and extruded filaments, it is to be recognized that other nanomaterials (e.g., nanoparticles, nanowires, graphene, carbon black and the like) can be utilized similarly using some or all of the disclosure herein. These alternative nanomaterials can be similarly difficult to incorporate homogeneously within a polymer composite.

More specifically, the inventors discovered solution-based processes that can be used to dissolve both carbon nanotubes and/or another nanomaterial and a polymer to produce a solvated polymer composite. The solvent content of the solvated polymer composite can then be gradually reduced through various processing operations to produce an extruded filament of a polymer composite, which is defined by a continuous phase of the polymer and carbon nanotubes and/or another nanomaterial homogeneously mixed throughout the continuous phase. The inventors found that having residual solvent throughout the various processing operations advantageously facilitates extrusion by lowering the glass transition temperature of the polymer composite. The amount of residual solvent can, in some instances, be dictated by the intended end use of the polymer composite.

The inventors further found that by adjusting the amount of residual solvent in an extruded filament of a polymer composite, the glass transition temperature can remain low enough to conduct additive manufacturing processes using conventional printing equipment while not compromising the integrity of the resulting printed object due to outgassing and void formation. The terms "part," "tool" and "article" may be used synonymously herein with the terms "object" and "printed object." Desirably, an extruded filament of the present disclosure can contain a non-zero amount of residual solvent up to about 5% by weight of the extruded filament, or more particularly up to about 3% by weight of the extruded filament. Higher amounts of residual solvent can also be acceptable in certain instances.

After printing, further solvent removal occurs and the glass transition temperature increases. The subsequent increase in glass transition temperature upon printing can also be advantageous when considering the operating conditions for manufactured parts. The typical thermoplastics used in fused deposition modeling (FDM) manufacturing are, by definition, able to be re-melted at the glass transition temperature, which limits the thermal envelope one might expose such articles to upon deployment. This can be especially true when the article is load-bearing in nature, for example, and the softening of the polymer during heat exposure might result in mechanical failure. The drastic increase in glass transition temperature of the polymer composites of the present disclosure, in contrast, can extend the viable thermal envelope of such articles. In terms of polymer classification, the presently described polymer composites behave more like thermosets after an article has been formed, which can be much more desirable from an operational and manufacturing standpoint. As such, vastly improved mechanical strength can result by virtue of the present disclosure.

To facilitate the solution-based composite manufacturing processes discovered by the inventors, a relatively high-boiling solvent having good dissolution properties for both the polymer and the carbon nanotubes can be chosen. The inventors found that o-dichlorobenzene can be particularly desirable for this purpose due to its ability to dissolve both polymers and carbon nanotubes at high concentrations. In addition, the relatively high boiling point of this solvent allows it to be retained in an extruded filament after processing is complete. Other solvents can also suitable for use, as discussed hereinbelow.

Moreover, the inventors further discovered techniques whereby carbon nanotubes can be dispersed from one another prior to being combined with the polymer, which can promote uniform mixing of the carbon nanotubes in a polymer composite. A modified chlorosulfonic acid dispersion process can be used for this purpose. Desirably, the dispersion techniques identified by the inventors allow the carbon nanotubes to remain in a non-functionalized state following their dispersion from one another, thus maintaining their high electrical conductivity values once incorporated within a polymer composite. Further, no surfactants become associated with the carbon nanotubes in the dispersion processes identified by the inventors. In addition to facilitating the formation of carbon nanotube polymer composites, the carbon nanotube dispersion techniques described herein can also be independently practiced to produce dispersed carbon nanotubes for other applications.

In addition to their ability to convey electrical conductivity to a printed object, carbon nanotubes can also improve a printed object's mechanical properties. The ability to homogeneously mix carbon nanotubes with polymers in the present disclosure can allow mechanical properties to be expressed more strongly than when the carbon nanotubes are non-uniformly mixed. As such, the present disclosure is also advantageous from the standpoint of allowing improved mechanical and electrical properties to be realized simultaneously in a printed object. Furthermore, the carbon nanotubes can significantly improve the thermal conductivity of polymers that are otherwise poorly thermally conductive.

Accordingly, the present disclosure describes carbon nanomaterial polymer composites containing a non-zero amount of residual solvent, more specifically a carbon nanotube polymer composite in certain embodiments. The carbon nanomaterial polymer composites can be in any desired form, although extruded filaments and foams can be particularly desirable forms for utilization in downstream processes, such as additive manufacturing processes. Extruded filaments can be formed according to the processes described herein. Foaming techniques are understood by persons having ordinary skill in the art, and the presence of the carbon nanomaterial does not significantly impact the foaming process.

In various embodiments, extruded filaments of the present disclosure can include a polymer as a continuous phase, a nanomaterial homogeneously mixed throughout the continuous phase, and above 0% to about 15% solvent by weight. Depending on the solvent content, the extruded filaments can be in solid or semi-solid form. In more particular embodiments, the nanomaterial can be carbon nanotubes or a mixture of carbon nanotubes with another nanomaterial, wherein the extruded filaments contain carbon nanotubes homogeneously mixed throughout the continuous phase defined by the polymer.

Polymer composites containing carbon nanotubes can be electrically conductive if the carbon nanotubes are initially electrically conductive and are handled properly during formation of the polymer composites, particularly when forming dispersed carbon nanotubes. Illustrative processes for producing dispersed carbon nanotubes that maintain substantially the same electrical conductivity values as pristine carbon nanotubes are discussed hereinbelow. The dispersion processes of the present disclosure advantageously provide for the carbon nanotubes to remain non-functionalized during and following the dispersion process, as discussed hereinbelow. The dispersion processes disclosed herein can be employed in conjunction with the filament-forming processes of the present disclosure, or the dispersion processes can be practiced independently in producing dispersed carbon nanotubes for other purposes. Further advantageously, the dispersion processes disclosed herein can produce dispersed carbon nanotubes that are surfactant free, such that no surfactants become incorporated in the polymer composites or extruded filaments of the present disclosure. Improved properties of the polymer composites and extruded filaments can also be realized by keeping their continuous phases free of surfactants. For example, surfactants can at least partially degrade otherwise favorable mechanical and electrical properties.

Accordingly, in some embodiments, the polymer composites, extruded filaments and foams disclosed herein can be electrically conductive, provided that the carbon nanotubes are present above a percolation threshold concentration in the continuous phase. In more particular embodiments, extruded filaments of the present disclosure can contain about 0.0001% to about 10% carbon nanotubes by weight, or about 0.001 to about 8% carbon nanotubes by weight, or about 0.01% to about 5% carbon nanotubes by weight. Higher weight percentages of carbon nanotubes can result in increased electrical conductivity values, provided that the carbon nanotubes continue to remain capable of being mixed homogeneously in the continuous phase defined by the polymer.

In more particular embodiments, the carbon nanotubes incorporated in the polymer composites and extruded filaments of the present disclosure can be single-walled carbon nanotubes. In still more particular embodiments, at least a portion of the carbon nanotubes incorporated in the polymer composites and extruded filaments can be single-walled carbon nanotubes that have metallic chiralities. As used herein, the term "carbon nanotube chirality" refers to a double index (n,m) describing a particular carbon nanotube, where n and m are integers that describe the cut and wrapping of hexagonal graphite when formed into a tubular structure. Such designation of a carbon nanotube's chirality will be familiar to one having ordinary skill in the art. The term "semiconducting carbon nanotube" refers to a carbon nanotube that is defined by the relationship $|m-n|=3k+1$, where k is an integer, and the term "metallic carbon nanotube" refers to a carbon nanotube that is defined by the relationship $|m-n|=3k$, where k is an integer. Carbon nanotubes may be further characterized as being "zig-zag chirality" or "armchair chirality" based upon their chiral indices. For example, metallic carbon nanotubes having m=n are characterized as "armchair chirality" carbon nanotubes. Illustrative metallic carbon nanotube chiralities include, for example, (3,0), (6,0), (9,0), (12,0), (15,0), (4,1), (7,1), (10,1), (13,1), (5,2), (8,2), (11,2), (14,2), (6,3), (9,3), (12,3), (7,4), (10,4), (13,4), (8,5), (11,5), (9,6), (12,6), (10,7), and (11,8).

The carbon nanotubes employed in the present disclosure can be produced by any suitable technique. Suitable carbon nanotube synthetic processes can include, for example, arc methods, laser oven, chemical vapor deposition, flame synthesis, and high pressure carbon monoxide (HiPCO). The synthetic conditions of any of these techniques can be altered to change the chirality distribution produced, particularly to favor the production of carbon nanotubes with a dominant carbon nanotube chirality or type being produced. Further, the carbon nanotubes can be purified or unpurified. Illustrative carbon nanotube purification techniques can include removal of metal catalysts, removal or non-nanotube carbon residue, chirality enrichment, or any combination thereof. In some embodiments, at least removal of non-nanotube carbon residue can also take place in conjunction with the carbon nanotube dispersion techniques discussed in further detail below.

Suitable solvents for practicing the disclosure herein can include those that are capable of both solubilizing carbon nanotubes and polymers in acceptable quantities. In more particular embodiments, a suitable solvent for solubilizing carbon nanotubes and polymers, as well as for being incorporated in the extruded filaments disclosed herein, can be o-dichlorobenzene. Not only does o-dichlorobenzene desirably solubilize both carbon nanotubes and polymers at acceptable levels, but the relatively high boiling point of this solvent allows it to be controllably removed when processing the polymer composites and extruded filaments disclosed herein. In o-dichlorobenzene, the practical solubility limit of carbon nanotubes is about 4 mg/mL, above which viscosity begins to increase and may hamper further processing into a polymer composite of the present disclosure. A concentration of about 50 g/L represents a reasonable solubility limit for the polymer. For certain high-performance polymers, heating may be needed to promote dissolution, and the relatively high boiling point of o-dichlorobenzene can be advantageous in this regard. Moreover, once processing to form the polymer composites and extruded filaments is completed, residual o-dichlorobenzene is readily retained therein until the polymer composites or extruded filaments are ready for further use. In some embodiments, a co-solvent can also be present in combination with o-dichlorobenzene when practicing the disclosure herein. Co-solvents can be used to further tailor the properties of an extruded filament, for example. Other suitable solvents that can be used alone or in combination with o-dichlorobenzene include, for example, N,N-dimethylformamide, N-methylpyrollidone, propylene glycol, and ethyl lactate.

Prior to forming an extruded filament, a solvent content of a solvated composite containing a carbon nanomaterial, particularly carbon nanotubes, can range between about 10% to about 30% by weight. A solvent content within this range can be sufficient to solubilize both the polymer and the carbon nanomaterial and/or carbon nanotubes as well as to facilitate further processing operations. Specifically, a solvent content in a range between about 10% to about 30% by weight can allow an extruded filament to be produced, in which an amount of residual solvent is above 0% by weight and less than about 15% by weight.

As indicated above, the extruded filaments of the present disclosure contain an amount of residual solvent, such as o-dichlorobenzene, that is above 0% by weight to about 15% by weight. In some embodiments, the extruded filaments can contain about 5% to about 15% solvent by weight. In some instances, extruded filaments bearing a solvent content within this range can be less than desirable for additive manufacturing processes. For example, when too much residual solvent is present, it can be difficult to drive off a sufficient amount of the residual solvent when forming a printed object, excessive outgassing can occur, and the extruded filaments can possess excessive ovality for compatibility with a print head. In some instances, however, a solvent content within the foregoing range can be acceptable. In other embodiments, the extruded filaments can possess an amount of residual solvent that is above 0% to about 5% solvent by weight, or above 0% to about 3% by weight. Extruded filaments with a lower solvent content can possess more desirable properties in many instances.

The polymer defining the continuous phase of the polymer composites and extruded filaments disclosed herein is not considered to be particularly limited, other than being a thermoplastic polymer. In general, any polymer that can be co-dissolved with carbon nanotubes and processed according to the disclosure herein can be suitably used. For example, in various embodiments, the polymer utilized in the disclosure herein can include, for example, polyketones, polystrenes such as acrylonitrile-butadiene-styrene copolymer, polyetheretherketones, polyamides, polyolefins such as polyethylene or polypropylene, polyesters, polyurethanes, polyacrylonitriles, polycarbonates, polyetherimines, polyethyleneimine, polyethylene terephthalate, polyvinyl chloride, copolymers thereof, mixtures thereof, and the like. In more particular embodiments, the polymer can be a polyetherimine or a polycarbonate, and in still more particular embodiments, the polymer can be a polyetherimine. Polyetherimine polymers can be especially desirable due to their high strength, thermal stability and radiation resistance, which can make them well suitable for aerospace applications. In some embodiments, a mixture of polymers can be present in combination with one another. In more specific embodiments, a polyetherimine or a polycarbonate can be present in combination with a secondary polymer. Suitable secondary polymers are not considered to be particularly limited.

In further embodiments, a variety of other nanomaterials can be substituted for carbon nanotubes in the polymer composites and extruded filaments of the present disclosure, or these alternative nanomaterials can be present in combination with carbon nanotubes in some instances. Other nanomaterials that can be present include, for example, metal nanoparticles, non-metallic nanoparticles, nanodiamond, graphene, carbon black, and the like. When used in combination with carbon nanotubes, the alternative nanomaterial(s) can further tailor the properties of the polymer composites and extruded filaments, such as through lowering the electrical impedance or increasing thermal conductivity.

Solution-based processing methods for producing the polymer composites and extruded filaments are also disclosed herein. In various embodiments, the methods can include dissolving a polymer and a nanomaterial in a solvent to produce a solvated composite, reducing a solvent content of the solvated composite to within a range of about 10% to about 30% by weight to produce a partially desolvated composite, forming first particles of the partially desolvated composite, supplying the first particles to an extruder, and extruding a first filament containing the polymer as a continuous phase and the nanomaterial homogenously mixed throughout the continuous phase. At least a portion of the solvent remains in the first filament.

Alternately, the solvated composite containing a dissolved polymer and a nanomaterial in a solvent can be foamed. Suitable foaming techniques will be understood by persons having ordinary skill in the art.

In more specific embodiments, the nanomaterial includes carbon nanotubes or a mixture of carbon nanotubes with nanomaterials such as, for example, nanowires, nanoparticles, nanodiamond, graphene, carbon black, or the like. These alternative nanomaterials can also be employed singularly or in combination with one another without carbon nanotubes being present in some embodiments.

In more particular embodiments, an amount of solvent remaining in the first filament can range between about 5% to about 15% solvent by weight. As indicated above, extruded filaments having a solvent content within this range can be unsuitable for downstream applications, such as additive manufacturing processes, in some instances. In more particular embodiments, the solvent content of the first filament can range between about 5% to about 10%, or between about 10% to about 15%, or between about 5% to about 7.5%, or between about 7.5% to about 10%, or between about 10% to about 12.5%, or between about 12.5% to about 15%, or between about 8% to about 12% by weight.

In the event that the solvent content of the first filament is undesirably high or the first filament has one or more unwanted properties (e.g., excessive ovality), the methods of the present disclosure can further include forming a second filament with a lower solvent content. More specifically, in various embodiments, methods of the present disclosure can include forming second particles from the first filament, supplying the second particles to an extruder, and extruding the second particles to form a second filament, where the second filament has above 0% to about 5% solvent by weight. In more particular embodiments, an amount of solvent in the second filament can range from above 0% to about 3% solvent by weight, or above 0% to about 2% solvent by weight, or above 0% to about 1% solvent by weight. In more specific embodiments, an amount of solvent in the second filament can range from about 1% to about 2% or about 1% to about 3% solvent by weight.

In various embodiments, an amount of the nanomaterial, such as carbon nanotubes or an alternative nanomaterial, in the first filament or the second filament can range between about 0.0001% to about 10% by weight, or about 0.001 to about 8% by weight, or about 0.01% to about 5% by weight. Carbon nanotube loadings within this range are sufficient for conveying electrical conductivity to the extruded filament and printed objects obtained therefrom.

When carbon nanotubes are used in producing the first filament, the carbon nanotubes can be dispersed (i.e., exfoliated or debundled) from one another prior to being dissolved in the solvent with the polymer. Prior dispersion of the carbon nanotubes can promote their dissolution in the solvent and facilitate formation of the solvated composite. Suitable dispersion techniques for use in conjunction with forming extruded filaments and other methods of the present disclosure are discussed in further detail below. Desirably, the carbon nanotube dispersion methods described herein are accomplished without utilizing surfactants, which might otherwise become incorporated in an extruded filament and compromise its properties. Further, dispersed carbon nanotubes produced in accordance with the present disclosure can be isolated as a solid material without additional functionalization of the carbon nanotubes, which would otherwise compromise the electrical conductivity of the extruded filaments and polymer composites disclosed herein.

In more specific embodiments, dispersing the carbon nanotubes from one another can include: dissolving a quantity of carbon nanotubes in chlorosulfonic acid under an inert atmosphere; after dissolving the quantity of carbon nanotubes in the chlorosulfonic acid, reacting the chlorosulfonic acid with an alcohol and precipitating dispersed carbon nanotubes, and collecting the dispersed carbon nanotubes. Suitable techniques for collecting the dispersed carbon nanotubes can include, for example, any combination of washing, filtration, decantation, centrifugation, and the like. Such dispersion techniques can be employed in conjunction with the filament extrusion methods disclosed herein, or they can be employed independently in other applications wherein it is desired to obtain or utilize dispersed carbon nanotubes, for example, when depositing carbon nanotube layers within a nanoelectronic device.

Chlorosulfonic acid has been recognized for several years as a "universal" solvent for solubilizing and dispersing carbon nanotubes from one another. However, the high reactivity and acidity of this solvent can be problematic. In conventional approaches, the solvent can undergo a reaction with moisture to produce hydrogen chloride and sulfuric acid, the latter of which can induce a functionalization reaction of the carbon nanotubes. As indicated above, such functionalization of the carbon nanotubes can be undesirable in many instances due to the decreased electrical conductivity that results.

As such, the inventors discovered that dispersed carbon nanotubes without functionalization can be produced through excluding moisture from the chlorosulfonic acid solution of carbon nanotubes (i.e., by maintaining an inert atmosphere such as dry nitrogen or argon) and then carefully reacting the chlorosulfonic acid with an alcohol such as methanol, ethanol, propanol, isopropanol, butanol, or isobutanol, which does not produce sulfuric acid. In the case of methanol, the reaction with chlorosulfonic acid produces methyl sulfate (i.e., the monoester of sulfuric acid), which does not undergo a reaction with the carbon nanotubes. Since the carbon nanotubes become insoluble once the methyl sulfate has been formed, the carbon nanotubes can be easily isolated as discussed above. As such, dispersed carbon nanotubes can be readily introduced in the filament extrusion processes disclosed herein.

Downstream applications of the extruded filaments are also contemplated in various embodiments of the present disclosure, as discussed hereinafter.

In some embodiments, additive manufacturing processes of the present disclosure can include supplying an extruded filament from a print head, and depositing the extruded filament in a desired shape in a layer-by-layer deposition process. Suitable shapes are not considered to be particularly limited, and a suitable deposition pattern can be executed under computer control. In general, a printed object of any shape that can be conventionally printed during additive manufacturing processes can be similarly produced using the extruded filaments disclosed herein. In more specific embodiments, the extruded filaments employed in the additive manufacturing processes can contain carbon nanotubes as a nanomaterial and a polyetherimine or a polycarbonate as a polymer. As such, printed objects of the present disclosure can include a polyetherimine or a polycarbonate as a continuous phase and carbon nanotubes mixed homogenously therein. Alternately, multiple filaments having a different loading of carbon nanotubes therein can be employed to provide heterogeneous carbon nanotube distributions in the printed object, such as a gradient distribution, for example.

In some embodiments, the additive manufacturing processes of the present disclosure can further include an annealing operation to complete removal of solvent in forming a final part. Heating can take place using radiant heat, microwave radiation, and/or infrared heating, and in some embodiments, heating can take place under inert atmosphere or reduced pressure to promote solvent removal.

EXAMPLES

Example 1: Production of a Carbon Nanotube Composite Powder. Single-walled carbon nanotubes (Thomas Swarm Elicarb) and polyetherimide (ULTEM™) were mixed in separate portions of hot o-dichlorobenzene and dissolved. The solutions were then combined and stirred for several days to ensure homogeneity. The resulting solvated composite (1 wt. % carbon nanotubes and polyetherimide) was placed in a vacuum oven and heated to reduce the solvent content. The vaporized o-dichlorobenzene was trapped for subsequent recycling. After partial removal of the solvent, the solvent content was about 30% by weight. The partially desolvated composite was then cooled to −70° C. (liquid $N_2$) and pulverized in a mill to produce small particles, which were then fed to an extruder for further processing.

Example 2: Dispersion of Carbon Nanotubes. Prior to dissolution in o-dichlorobenzene, the carbon nanotubes of Example 1 were dissolved in chlorosulfonic acid under an inert atmosphere at a concentration below 5 mg/mL. Upon forming the chlorosulfonic acid solution, methanol was added to completely convert the chlorosulfonic acid into methyl sulfate, which resulted in precipitation of the carbon nanotubes. The mixture was filtered, and the carbon nanotubes were rinsed with additional methanol. After rinsing with methanol, the carbon nanotubes were further rinsed with a small quantity of o-dichlorobenzene in preparation for dissolution in this solvent.

The dispersed carbon nanotubes were combined in o-dichlorobenzene at a concentration exceeding 2 mg/mL and sonicated lightly to minimize damage to the carbon nanotube structure. The solution was then centrifuged at 11,000 rpm, which resulted in formation of a gel-like dispersion of carbon nanotubes at the bottom of the vial. The supernatant at the top of the vial, which contained tube fragments and non-nanotube carbon, was decanted and filtered to recover the o-dichlorobenzene for reuse. The gel-like dispersion of carbon nanotubes contained 2-3% carbon nanotubes by weight and was added directly to the solution of polyetherimine in this solvent in Example 1. Alternately, the gel-like dispersion can be stored for later use.

Example 3: Extrusion of a Composite Filament. The powder produced in Example 1 was fed to an extruder operating at 200° C. The resulting filament had modest ovality and minimal bubbling. The solvent content of the extruded filament at this juncture was about 10-15% by weight.

To improve ovality and decrease the solvent content further, the filament was re-milled to produce particles, and the particles were again fed to an extruder. Extrusion of the filament took place this time at 300° C. The resulting filament had improved ovality, and the solvent content after the second extrusion was approximately 3% by weight.

Figure 2:
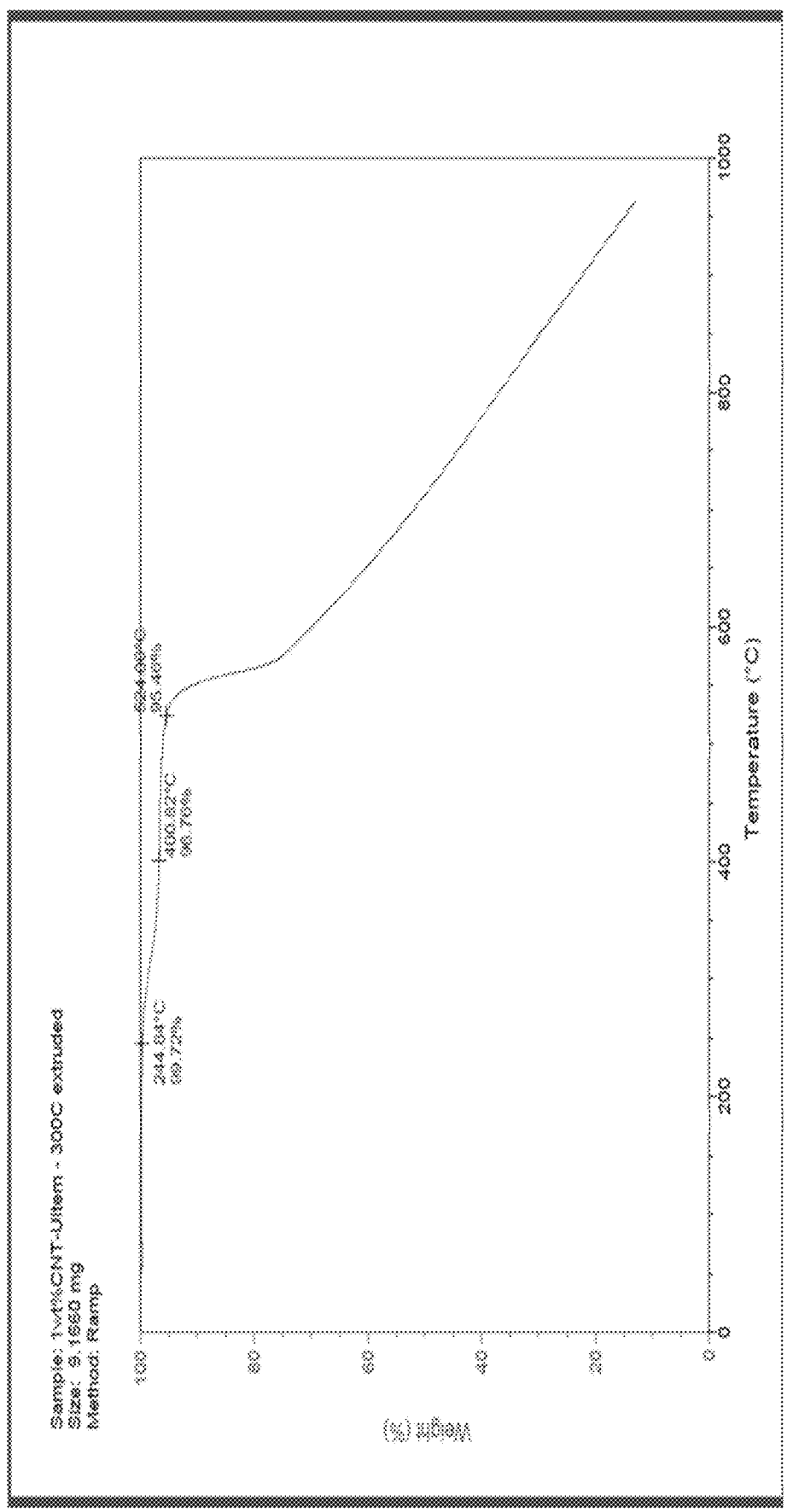
FIG. 2 shows an illustrative TGA profile of the extruded filament produced in Example 3.

Example 4: Characterization. FIG. 1 shows an illustrative SEM image of the extruded filament produced in Example 3. As shown in FIG. 1, the carbon nanotubes were well dispersed in the polymer matrix. FIG. 2 shows an illustrative TGA profile of the extruded filament produced in Example 3. As shown in FIG. 2, the glass transition temperature was below approximately 400° C., and good thermal stability could be realized up to 500° C.

Various o-dichlorobenzene solutions containing a range of carbon nanotube loading were also deposited as thin films onto a silicon wafer for further electrical characterization. Table 1 summarizes the surface resistivity of the thin films after solvent removal as a function of the carbon nanotube loading.

TABLE 1

| Carbon Nanotube Loading (wt. %) | Resistivity (Ohm-cm) |
|---|---|
| 0.1 | 120000 |
| 0.45 | 45 |
| 1 | 5.5 |
| 5 | 0.00945 |

Although the disclosure has been described with reference to the disclosed embodiments, those skilled in the art will readily appreciate that these only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. An extruded filament comprising:
   a polymer as a continuous phase, wherein the polymer comprises a polyetherimine;
   a nanomaterial homogeneously mixed throughout the continuous phase, wherein the nanomaterial comprises single-walled carbon nanotubes and the extruded filament comprises about 0.01% to about 5% by weight of the single-walled carbon nanotubes; and
   above 0% to about 15% by weight of solvent.

2. The extruded filament of claim 1, wherein the solvent comprises o-dichlorobenzene.

3. The extruded filament of claim 1, wherein the single-walled carbon nanotubes are dispersed from one another.

4. The extruded filament of claim 3, wherein the single-walled carbon nanotubes are non-functionalized.

5. The extruded filament of claim 1, wherein the extruded filament comprises above 0% to about 5% by weight of the solvent.

6. A printed object formed from the extruded filament of claim 1.

7. An extruded filament comprising:
   a polymer as a continuous phase, wherein the polymer comprises a polyetherimine;
   a nanomaterial homogeneously mixed throughout the continuous phase, wherein the nanomaterial comprises single-walled carbon nanotubes, wherein the extruded filament comprises about 0.01% to about 5% by weight of the single-walled carbon nanotubes; and
   above 0% to about 5% by weight of solvent, wherein the solvent comprises o-dichlorobenzene.

8. The extruded filament of claim 7, wherein the single-walled carbon nanotubes are dispersed from one another.

9. The extruded filament of claim 7, wherein the single-walled carbon nanotubes are non-functionalized.

* * * * *